(12) United States Patent
James et al.

(10) Patent No.: US 6,647,512 B1
(45) Date of Patent: Nov. 11, 2003

(54) METHOD FOR RESTORING CMOS IN A JUMPERLESS SYSTEM

(75) Inventors: Don R. James, Houston, TX (US); Randall L. Hess, Colorado Springs, CO (US); Mark A. Piwonka, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 399 days.

(21) Appl. No.: 09/675,354

(22) Filed: Sep. 29, 2000

(51) Int. Cl.$^7$ .................................................. G06F 11/00
(52) U.S. Cl. ............................................. 714/36; 713/2
(58) Field of Search ...................... 714/36, 27; 713/1–2

(56) References Cited

U.S. PATENT DOCUMENTS

| | | | |
|---|---|---|---|
| 5,463,764 A | * 10/1995 | Mueller | 714/15 |
| 5,463,766 A | * 10/1995 | Schieve et al. | 713/2 |
| 5,822,581 A | * 10/1998 | Christeson | 713/1 |
| 6,014,758 A | * 1/2000 | Poisner | 714/36 |
| 6,018,806 A | * 1/2000 | Cortopassi et al. | 714/8 |
| 6,052,800 A | * 4/2000 | Gentile et al. | 714/36 |
| 6,081,892 A | * 6/2000 | Lomas | 713/2 |
| 6,240,519 B1 | * 5/2001 | James et al. | 713/202 |
| 6,393,586 B1 | * 5/2002 | Sloan et al. | 714/25 |
| 6,421,792 B1 | * 7/2002 | Cromer et al. | 714/36 |
| 6,487,464 B1 | * 11/2002 | Martinez et al. | 700/79 |
| 2002/0162052 A1 | * 10/2002 | Lewis | 714/36 |

OTHER PUBLICATIONS

*System Management*, Intel 440BX AGPset Technical Information Center—System Management, Intel Corporation, 2000 (pp. 1–7).

*System Management*, Intel 430TX PCIset Technical Information Center—System Management, Intel Corporation, 2000 (pp. 1–7, 18).

*Advanced Configuration and Power Interface Specification*, Intel Microsoft Toshiba Revision 1.0 Dec. 22, 1996 (pp. 4–47 through 4–52).

\* cited by examiner

*Primary Examiner*—Scott Baderman
*Assistant Examiner*—Joshua Lohn

(57) ABSTRACT

A method for easily restoring CMOS parameters in a computer having a multi-function power button is provided. In one embodiment, the method for restoring CMOS parameter values in a computer includes (a) pressing the power button for a predetermined time delay while the computer is performing a power-on self test ("POST"), thereby placing the computer in an OFF state; and (b) momentarily pressing the power button to turn on the computer. Pressing the power button for four seconds preferably invokes a power button override function. The power button override function unconditionally forces the computer to a "soft-off" state. The BIOS is preferably configured to determine if the power-override function was invoked during the POST in the previous boot-up, and if so, to replace the CMOS parameter values with backup parameter values before proceeding with the current boot-up. The CMOS parameter values are preferably backed up only if they have changed and the BIOS has successfully completed the POST procedure with the changed values. This ensures that the backup values will allow the computer to boot when CMOS parameter restoration is needed.

10 Claims, 2 Drawing Sheets

METHOD FOR RESTORING CMOS IN A JUMPERLESS SYSTEM

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to making computer systems more user-friendly. In particular, the present invention relates to a method for conveniently restoring the default basic input/output system ("BIOS")parameter settings from a nonvolatile memory in a computer.

2. Description of Related Art

Personal computers include a basic input/output system ("BIOS")stored in nonvolatile memory. The BIOS is a set of instructions which are executed to conduct the system initialization and to provide control of low level functions in the computer. Normally, the nonvolatile memory is an electrically-erasable read-only memory ("EEPROM") chip, which allows the BIOS to be updated through software control. This is commonly called a "flash" BIOS. Under normal circumstances, the BIOS ROM is permanent and there is normally no need to deal with it.

In addition to the BIOS ROM, most conventional computer systems include a small CMOS memory and real time clock ("RTC") unit. This component keeps track of the time and date, and stores BIOS configuration parameters when the computer was turned off, so that this information is readily available when the computer is turned back on. To preserve this information while the computer is off, this component also includes a low-power, long life battery.

The acronym CMOS stands for "Complementary Metal Oxide Semiconductor", and generally refers to one type of technology used to make semiconductor devices (i.e., integrated circuits) such as processors, chipset chips, DRAM, etc. Devices constructed using CMOS technology advantageously require very little power compared to other semiconductor technologies. Consequently, CMOS technology is a natural choice for implementing the memory and RTC unit so that the amount of power required from the battery is minimal, and the battery would last a longer. This memory came to be called just "CMOS", since in the early days of personal computer development most parts of the computer did not use CMOS. Although modem processors are typically made entirely with CMOS technology, "CMOS" by itself usually still refers to the BIOS settings memory.

The information stored by the CMOS memory typically includes the type of floppy disk drive, hard disk settings, the amount of memory, clock speeds, wait states, passwords, initial boot drive selection, and other configuration parameters. The BIOS directs the processor to retrieve this information to make the power-on configuration process more efficient. The CMOS used to be relatively small, about 64 or 128 bytes. As the complexity of computers has increased, the number of configuration parameters has increased. To keep pace with the increased number of parameters, the CMOS has been expanded (e.g., to 2048 bytes) to allow storage of additional parameters such as power management configuration parameters and resource assignments for Plug and Play systems. The increased number of parameters has increased the likelihood of an incorrect parameter being present, whether due to faulty user entry or to corruption of the memory contents. This is of utmost concern since the presence of an error in CMOS may render the computer unbootable, and this error may not be rectified by simply re-booting the computer due to the nonvolatile nature of the CMOS memory.

Since it in not uncommon for computer systems to develop incorrect or corrupted CMOS data, system designers have developed some techniques to clear CMOS memory. Certain few versions of BIOS will clear the CMOS settings if the <Insert> key on the keyboard is held down by the user while the computer is performing its boot process. More commonly, computer manufacturers pro vide a jumper on the "motherboard" (the main circuit board in the computer) that connects the battery to the CMOS memory. To clear the CMOS memory, the user must unplug the computer, open the case, locate the jumper and remove the jumper and thereby disconnect the battery from the CMOS memory. Without power, the CMOS memory will eventually lose all the stored information. This time period may be relatively lengthy because stray capacitance in the system may need to completely discharge before the CMOS memory clears. To speed up the process, some manufacturers provide a second jumper setting to ground the positive power supply input to the CMOS memory. In this case, the jumper is moved from a first setting to the second setting, left there for 30 seconds, and then replaced to the first setting. Grounding the positive power supply input discharges any stray capacitance at a much higher rate.

Most computer users find it undesirable, if not frustrating, to open the computer case, to locate a jumper on the motherboard, to remove and replace the jumper, to close the computer case, and reprogram the BIOS settings. Further, if the user calls for technical assistance, it is very difficult for a computer support person to guide a novice user through this process over the telephone. Providing a CMOS-memory-restoration feature through BIOS detection of a key-press may become infeasible as the multitude of alternative input devices and new keyboard configurations become popular. Pointer devices, speech recognition, and touch-sensitive screens may supplant the standard keyboard and require BIOS software to access CMOS prior to detecting the key-press that indicates the contents of CMOS should be ignored and erased. Consequently, a convenient way of restoring CMOS is desired.

SUMMARY OF THE INVENTION

Accordingly, there is provided herein a method of leveraging a multi-function power switch to provide a CMOS-restoration functionality. In one embodiment, the method for restoring CMOS parameter values in a computer having a multi-function power button includes (a) pressing the power button for a predetermined time delay while the computer is performing a power-on self test ("POST"), thereby placing the computer in an OFF state; and (b) momentarily pressing the power button to turn on the computer. Pressing the power button for four seconds preferably invokes a power button override function. The power button override function unconditionally forces the computer to a "soft-off" state. The BIOS is preferably configured to determine if the power-override function was invoked during the POST in the previous boot-up, and if so, to replace the CMOS parameter values with backup parameter values before proceeding with the current boot-up. The CMOS parameter values are preferably backed up only if they have changed and the BIOS has successfully completed the POST procedure with the changed values. This ensures that the backup values will allow the computer to boot when CMOS parameter restoration is needed.

BRIEF DESCRIPTION OF THE DRAWINGS

A better understanding of the present invention can be obtained when the following detailed description of the preferred embodiment is considered in conjunction with the following drawings, in which.

Figure 1:
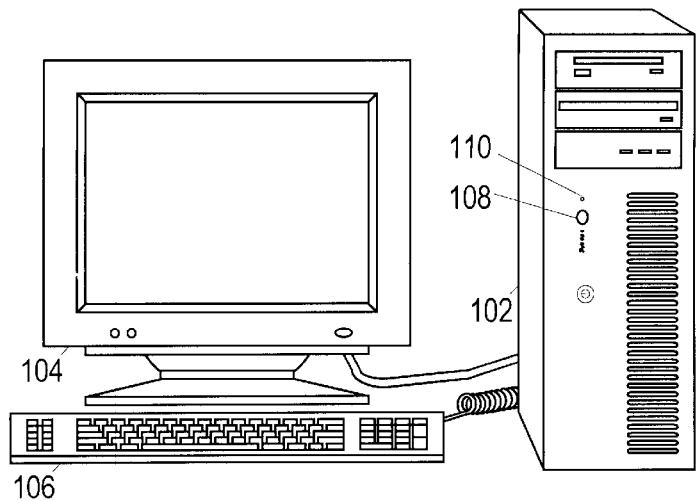
FIG. 1 shows a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

In addition, certain terms are used throughout the following description and claims to refer to particular system components. This document does not intend to distinguish between components that differ in name but not function. In the following discussion and in the claims, the terms "including" and "comprising" are used in an open-ended fashion, and thus should be interpreted to mean "including, but not limited to . . .". Also, the term "couple" or "couples" is intended to mean either an indirect or direct electrical connection. Thus, if a first device couples to a second device, that connection may be through a direct electrical connection or through an indirect electrical connection via other devices and connections.

DETAILED DESCRIPTION OF THE PREFERRED EMBODIMENTS

Turning now to the figures, FIG. 1 shows a computer system 100 in accordance with the preferred embodiment comprising a computer chassis 102 coupled to a display device 104 and a user input device 106. The computer chassis 102 preferably has a power button 108 and may also have a power indicator 110 such as a light emitting diode ("LED"). When the power button 108 is momentarily pressed, power indicator 110 illuminates and computer system 100 boots up. Momentarily pressing power button 108 a second time preferably places the computer system 100 in a reduced-power state.

At this point, a brief discussion of reduced-power states is warranted. Many computer system manufacturers have implemented a variety of reduced-power states for purposes such as conserving battery power, allowing fast boot-up, providing remote access, and extending component life. A standard known as the Advanced Configuration and Power Management Interface Specification ("ACPI") has been promulgated by Intel, Microsoft, and Toshiba to standardize the management of these states. Revision 1.0 of this standard defines user-initiated events to request the operating system to transition to a reduced-power state. Among the events defined there is momentarily pressing the power button, which causes a transition from the working state to a preferred reduced-power state configured by the user. Significantly, however, is another event in which pressing the power button for four seconds causes an unconditional transition to a "SOFT-OFF" state (the SOFT OFF state is distinguished from a mechanical off state only by the presence of power to the power management circuitry). This event is defined to allow a user to force a reboot if the computer locks up or becomes unstable. Without this event, the user might be unable to force a reboot without physically unplugging the system.

Figure 2:
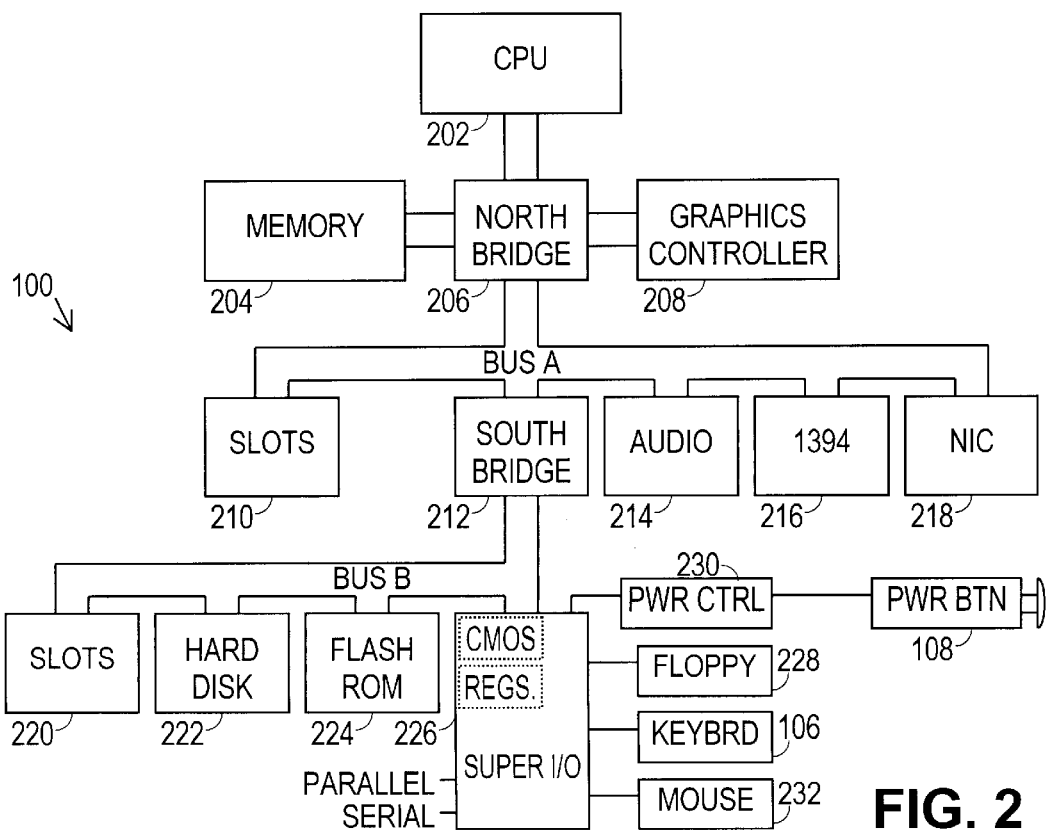
FIG. 2 is a functional block diagram of the computer system of FIG. 1.

FIG. 2 illustrates an exemplary architecture of computer system 100. Although the system 100 can be implemented with many other architectures, the embodiment shown in FIG. 2 is presented to aid in explaining the operation of a preferred embodiment. Computer system 100 includes a CPU 202 coupled to a bridge logic device 206 via a CPU bus. The bridge logic device 206 is sometimes referred to as a "North bridge" for no other reason than it often is depicted at the upper end of a computer system drawing. The North bridge 206 also couples to a main memory array 204 by a memory bus, and may further couple to a graphics controller 208 via an accelerated graphics port ("AGP"). The North bridge 206 couples CPU 202, memory 204, and graphics controller 208 to the other peripheral devices in the system through a primary expansion bus ("BUS A") which may be implemented as a peripheral component interconnect ("PCI") bus or an extended industry standard architecture ("EISA") bus. Various components that comply with the communications protocol and electrical requirements of BUS A may reside on this bus, such as an audio device 214, a IEEE 1394 interface device 216, and a network interface card ("NIC") 218. These components may be integrated onto the motherboard or they may be plugged into expansion slots 210 that are connected to BUS A.

If other secondary expansion buses are provided in the computer system, as is typically the case, another bridge logic device 212 is used to couple the primary expansion bus ("BUS A") to a secondary expansion bus ("BUS B"). This bridge logic 212 is sometimes referred to as a "South bridge" reflecting its location vis-a-vis the North bridge 206 in a typical computer system drawing. An example of such bridge logic is described in U.S. Pat. No. 5,634,073, assigned to Compaq Computer Corporation. Various components that comply with the bus protocol of BUS B may reside on this bus, such as hard disk controller 222, Flash ROM 224, and Super I/O controller 226. Slots 220 may also be provided for plug-in components that comply with the protocol of BUS B. Flash ROM 224 stores the system BIOS that is executed by CPU 202 during system initialization.

The Super Input/Output ("Super I/O") controller 226 typically interfaces to input/output devices such as a keyboard 106, a mouse 232, a floppy disk drive 228, a parallel port, a serial port, and sometimes a power controller 230 and various other input switches such as a power switch 108 and a suspend switch 109. In one embodiment, the Super I/O controller 226 includes control registers ("REGS") for configuring the input/output devices and for reporting their status. The Super I/O controller 226 preferably has the capability to handle power management functions such as reducing or terminating power to components such as the floppy drive 228, and blocking the clock signals that drive components such as the bridge devices 206, 212 thereby inducing a sleep mode in the expansion buses. The Super I/O controller 226 may further assert System Management Interrupt ("SMI") to indicate special conditions pertaining to input/output activities such as sleep mode.

Super I/O controller 226 may include battery-backed CMOS memory for storing BIOS configuration parameters for system 100, and may further include a counter/timer and a Real Time Clock ("RTC"). The counter/timer may be used to track the activities of certain components such as the hard disk 222 and the primary expansion bus, and induce a sleep mode or reduced power mode after a predetermined time of inactivity. The Super I/O controller 226 may also induce a low-power suspend mode if the suspend switch 109 is pressed, in which the power is completely shut off to all but a few selected devices. Exempted devices might include the Super I/O controller 226 itself and NIC 218. When Super I/O controller 226 senses a power switch closure, it asserts a system POWER_ON signal and initiates system boot-up. During system boot-up, the CPU 202 retrieves the BIOS from Flash ROM 224 and executes the BIOS. The BIOS stores system configuration parameters in CMOS, and retrieves these parameters to initialize and configure various system components to place the system in readiness for operation by a user.

During system initialization, the BIOS typically provides the user an opportunity to enter a "setup" program, in which the various system configuration parameters may be viewed and modified by the user. In order that the user might be provided with an easy-to-use interface, the setup program doesn't run until after the user input device 106 and the display device 104 have been initialized. Other components may also be configured by the BIOS prior to the execution of the setup program. Consequently, it is entirely possible for an incorrect configuration parameter to prevent the system from being properly configured, to prevent the system from booting and to prevent the user from accessing the setup program whereby the situation might be rectified. In these circumstances, it is desirable to restore the parameters to a set of values known to work properly. Typically this is done by removing the power from the CMOS memory, either by removing the battery while the computer is unplugged, or by disconnecting a jumper. When power is restored to the CMOS memory, a "CMOS invalid" bit is automatically set (typically in one of the Super I/O controller's control registers) to indicate that a loss of power has occurred. The BIOS examines this bit before using any of the configuration parameters from the CMOS memory, and if the bit is set, the BIOS uses default values to boot the computer and may automatically run the setup program to prompt the user for new parameter settings. The BIOS may then reset the "CMOS invalid" bit once new configuration parameters are stored in memory.

Figure 4:
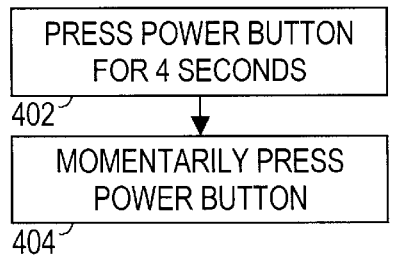
FIG. 4 illustrates a method for restoring a computer's CMOS parameters.

The effort involved in opening the case, locating, removing, and replacing the jumper, and then reprogramming the CMOS parameters is substantial, particularly for a novice unfamiliar with internal computer components and motherboards in particular. Accordingly, FIG. 4 shows a new method for restoring a computer's CMOS memory. A user, suspecting that the computer is failing to boot because of an incorrect CMOS parameter, presses and holds the power button for four seconds, as indicated by block 402. This may be done while the computer is trapped in the POST. Alternatively, this may be done just after the computer is turned on from a "soft-off" state, but before it has exited the POST. In either case, a "POST in progress" bit will be set, and a "Power Button Override" bit will be set, and the computer will be returned to the "soft-off" power state. These bits may be provided in power control registers in the south bridge.

Then, as indicated by block 404, the user presses the power button momentarily to turn the computer back on. The computer will automatically restore the CMOS parameters from a backup copy in response to the "Power Button Override" and "POST in progress" bits being set.

Figure 3:
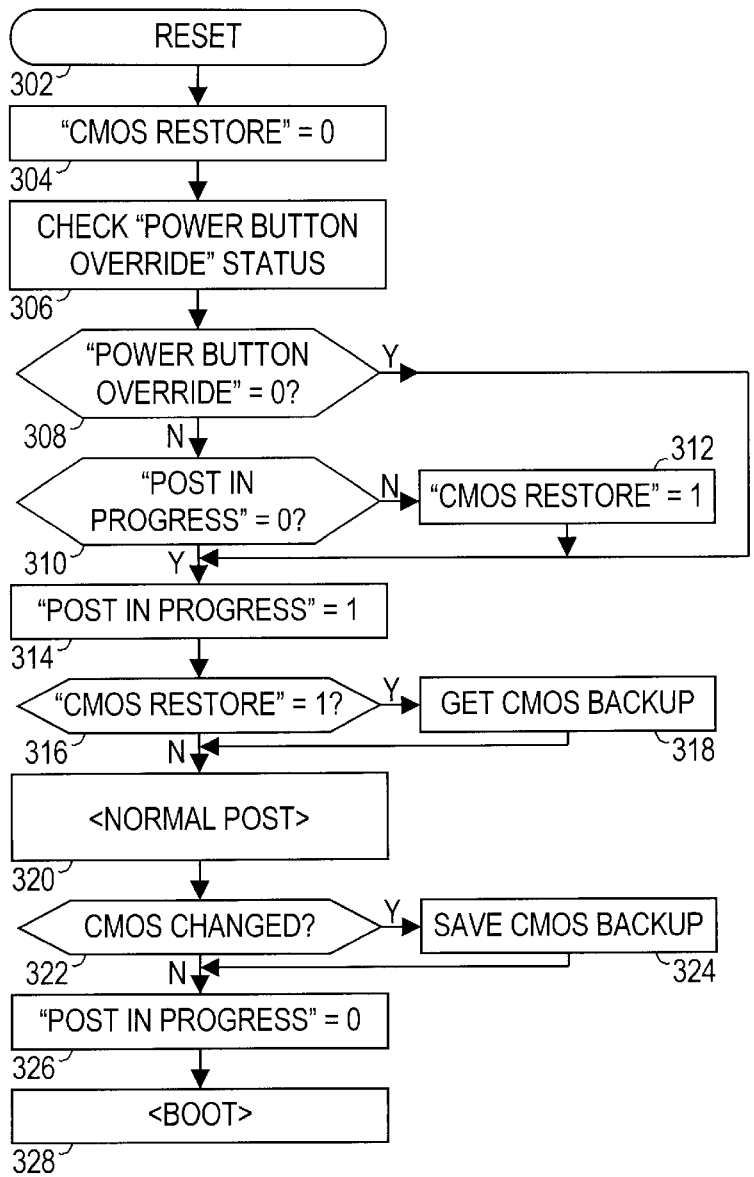
FIG. 3 is a flowchart of a BIOS implementation that provides the desired CMOS restoring feature.

FIG. 3 shows a flowchart of one BIOS implementation of this restoration procedure. Execution of the BIOS by the CPU is initiated by assertion of a system RESET signal, as indicated by block 302. In block 304, the BIOS initializes the "CMOS Restore" bit to zero, and in block 306 the BIOS retrieves the value of the "Power Button Override" bit from the power register. In block 308, the BIOS determines if the "Power Button Override" bit is clear. If yes, then execution passes to block 314. Otherwise, the BIOS checks to see if the "POST in progress" bit is clear. If yes, then execution passes to block 314. Otherwise, the BIOS sets the "CMOS Restore" bit to 1 in block 312, and execution passes to block 314. In block 314, the "POST in progress" bit is set to 1. In block 316, the BIOS checks to see if the "CMOS Restore" bit is set. If yes, then in block 318 the BIOS restores the CMOS settings from a backup copy. Block 320 indicates the normal POST that is performed by the BIOS. If the POST completes successfully, then in block 322, the BIOS checks to see if the CMOS parameters have changed (e.g., if the user has entered new values via the setup program). If yes, then in block 324 the new parameters are copied to backup memory locations. In block 326, the "POST in progress" bit is cleared, and in block 328, the BIOS initiates execution of the operating system.

It is noted that the power button 108 is multifunctional, and that this procedure extends the functionality of the power button. Pressing power button 108 momentarily toggles the computer between its working state and its reduced power state. Pressing and holding the power button for 4 seconds will force the computer into a "soft-off" state. Pressing and holding the power button for 4 seconds while the computer is in a POST state will additionally cause the computer to automatically restore backup settings to CMOS parameters during the next boot-up sequence.

It is noted that one of ordinary skill in the art, upon reviewing this disclosure, will recognize a number of variant implementations of this CMOS restoring procedure. The above discussion is not intended to exclude such recognizable variations, and it is intended that the following claims be interpreted to embrace all such variations and modifications.

What is claimed is:

1. A method for setting CMOS parameter values in a computer equal to stored backup values, wherein the method comprises:

determining if a power-button-override bit has been set while a POST-in-progress bit was set; and if so, copying stored backup values into memory locations of the CMOS parameters.

2. The method of claim 1, wherein the determining includes:

before setting the POST-in-progress bit, comparing the power-button-override bit to zero; and if the power-button-override bit is not equal to zero, comparing the POST-in-progress bit to zero.

3. The method of claim 2, wherein the determining further includes:

if the POST-in-progress bit is not equal to zero, setting a CMOS-restore bit to one.

4. The method of claim 2, further comprising:

setting the POST-in-progress bit to one before performing a POST routine;

performing a POST routine; and if the POST routine completes successfully, resetting the POST-in-progress bit to zero.

5. The method of claim 4, further comprising:

If the POST routine completes successfully, determining if any CMOS parameter values have been changed; and If any CMOS parameter values have been changed, storing a backup copy of the CMOS parameter values.

6. A computer system which comprises:

a nonvolatile configuration memory configured to store computer configuration parameters;

a nonvolatile BIOS memory configured to store basic input/output system ("BIOS")software;

a CPU coupled to the nonvolatile configuration memory, wherein after a system reset signal is asserted the CPU is configured to initialize the computer using said BIOS software and said computer configuration parameters stored in the configuration memory; and a power switch, wherein said BIOS configures the CPU to determine if during a previous boot operation the power switch was closed for at least a predetermined time, and if so, configures the CPU to replace the computer configuration parameter values with backup parameter values.

7. The computer system of claim 6, wherein the predetermined time is four seconds.

8. The computer system of claim 6, wherein the BIOS further configures the CPU to store a backup copy of the computer configuration parameter values only If the CPU successfully completes a computer system power-on self-test ("POST") procedure.

9. The computer system of claim 6, wherein the BIOS further configures the CPU to backup the computer configuration parameter values only if the computer configuration parameter values have been changed and the CPU has successfully completed a computer system power-on self-test ("POST") procedure.

10. The computer system of claim 6, wherein the CPU determines the power switch was closed for at least a predetermined time during a previous boot operation by determining before a POST procedure is initiated if both a post-in-progress bit and a power-button-override bit are asserted.

* * * * *